United States Patent [19]
Gilmore

[11] Patent Number: 5,452,786
[45] Date of Patent: Sep. 26, 1995

[54] HIGH-SPEED PADDLE DIVERTER

[75] Inventor: Phillip J. Gilmore, Healdsburg, Calif.

[73] Assignee: Rapistan Demag Corporation, Grand Rapids, Mich.

[21] Appl. No.: 277,209

[22] Filed: Jul. 19, 1994

[51] Int. Cl.⁶ .................................................. B65G 47/82
[52] U.S. Cl. .......................................................... 198/367
[58] Field of Search ........................ 198/367, 367.1, 198/370, 372

[56] References Cited

U.S. PATENT DOCUMENTS

| | | |
|---|---|---|
| 636,206 | 10/1899 | Kellington . |
| 1,636,429 | 7/1927 | Olson . |
| 2,053,328 | 9/1936 | Elliott . |
| 2,733,724 | 2/1956 | Warren . |
| 3,006,457 | 10/1961 | Weiss . |
| 3,232,417 | 2/1966 | Muller . |
| 3,522,870 | 8/1970 | Landry et al. . |
| 4,077,506 | 3/1978 | Schlottmann et al. . |
| 4,173,274 | 11/1979 | Kantarian et al. . |
| 4,194,614 | 3/1980 | Hrivnak . |
| 4,298,117 | 11/1981 | Kobayashi et al. ...................... 198/367 |
| 4,553,659 | 11/1985 | Reim et al. . |
| 4,643,291 | 2/1987 | Counter et al. ...................... 198/367 X |
| 4,711,357 | 12/1987 | Langenbeck et al. ............... 198/367 X |
| 4,785,942 | 11/1988 | Van Leijenhorst et al. . |
| 5,010,998 | 4/1991 | MacMillan ........................... 198/367 X |
| 5,217,104 | 6/1993 | Pelletier .................................. 198/367 |

FOREIGN PATENT DOCUMENTS

| | | | |
|---|---|---|---|
| 314881A | 5/1989 | European Pat. Off. . | |
| 2620036 | 11/1977 | Germany ................................ | 198/367 |
| 3918196 | 8/1990 | Germany ............................. | 198/367.1 |
| 0036820 | 3/1983 | Japan .................................... | 198/367 |
| 0232320 | 11/1985 | Japan .................................... | 198/367 |
| 1465395A | 3/1989 | U.S.S.R. . | |
| 1509305 | 9/1989 | U.S.S.R. ................................ | 198/367 |
| 1586974A | 8/1990 | U.S.S.R. . | |

OTHER PUBLICATIONS

Illustration of a prior art paddle diverter for use with a conveyor (FIGS. 1 and 2).

*Primary Examiner*—James R. Bidwell
*Attorney, Agent, or Firm*—Price, Heneveld, Cooper, Dewitt & Litton

[57] ABSTRACT

An apparatus and method for laterally diverting or shunting articles conveyed along a conveyor. An am or paddle is mechanically coupled to a rotating cam which drives the arm from a first or resting position parallel to the conveyor to a deflecting position across the conveyor at a first velocity profile and from the deflected position back to the resting position at a second, greater velocity profile in a single revolution of the cam. Velocity profiles can be optimized for the application by specification of the cam's geometry. Cycle times of 400 milliseconds, or 150 cycles per minute, are possible.

35 Claims, 5 Drawing Sheets

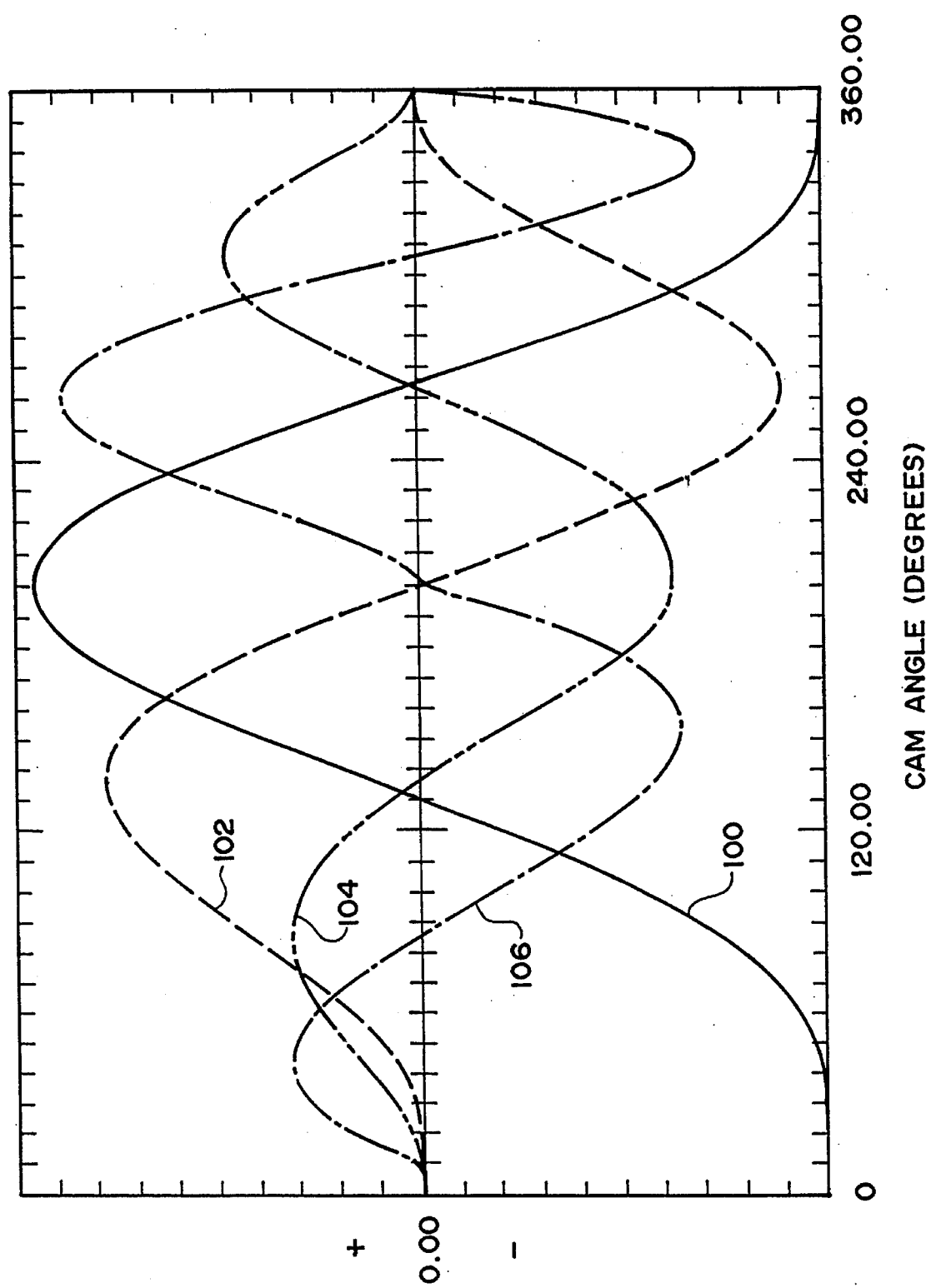

HIGH-SPEED PADDLE DIVERTER

BACKGROUND OF THE INVENTION

This invention relates to conveyor systems and particularly to a diverter for laterally diverting objects travelling along a conveyor, for example, to a branch conveyor or delivery point.

Diverter mechanisms have been employed to laterally divert an article to a branch line or delivery station. The diverter arm is selectively operable so that certain articles may be diverted while others continue on down the conveyor line past the diverter. With today's need to move many articles at ever increasing line speeds, many diverter designs are unable to actuate in the time required to divert articles from the conveyor to a branch line or delivery station. In addition, the mechanisms used to actuate known diverters tend to result in acceleration-induced forces which increase in proportion with diverter speed, resulting in noise, fatigue, and possible eventual failure of convey or components.

Because of the ever increasing throughput of articles travelling along conveyor systems, there is a long-felt need to produce a high-speed diverter capable of operating at cycle speeds of approximately 8,000 cycles per hour, or more than 2 cycles per second, while minimizing acceleration and jerk of the diverter.

SUMMARY OF THE INVENTION

The instant invention provides an article diverter for use with a conveyor including an arm assembly adapted to move from a position of rest parallel the conveyor to a deflecting position across he conveyor line. The arm assembly is actuated between the rest position and an extended position across the conveyor at a first velocity profile and from the extended position to the rest position at a second velocity profile that is greater than the first velocity profile. This asymmetric cycle profit is accomplished by a cam assembly driven by a motor. In one embodiment the cam assembly includes an asymmetric cam groove engaged by a cam follower attached to the arm assembly. The configuration of the asymmetric cam groove is designed in a manner that the first and second velocity profiles are established for most, or even all, displacement positions of the arm assembly. This allows acceleration and jerk, which are higher order time derivatives of displacement, to be optimized to a minimum level for the physical configuration of the diverter arm assembly. Extension and retraction of the arm assembly may occur within 400 milliseconds, which provides 150 cycles per minute or a little over 2 per second.

In another form of the invention, the cam assembly includes a cam plate received on a shaft of a gear reducer driven by either a motor that is unidirectionally driven. The arm is moved from the rest position to the extended position and back to the rest position in one complete revolution of the cam. In a preferred embodiment, the cam groove is asymmetric with respect to all possible axes that could be defined on the cam face that pass through the axis of rotation of the cam.

The advantages provided by this invention include the ability to divert packages at a rate greater than 2 per second, or approximately 150 packages per minute. The invention is based upon the realization that, because the arm does not divert any objects when retracting, it can return at a greater velocity than when extending from the rest position to the deflecting position and that these velocities and their resultant accelerations and jerks can be controlled by the cam profile. This minimizes force and noise in the mechanism. As a result, the cycle time of the diverter assembly can be significantly decreased. Furthermore, the diverter assembly has few moving parts, resulting in easy maintenance and repair of the system, thus lowering overall cost in operating diverter assembly.

BRIEF DESCRIPTION OF THE DRAWING FIGURES

A better understanding of the invention and the advantages provided thereby may be obtained by reference to the specification and the attached drawing figures, wherein:

FIG. 9 is a kinematic diagram illustrating the displacement, velocity, acceleration, and jerk characteristics of the diverter assembly embodied in FIGS. 1–8.

DETAILED DESCRIPTION OF THE VARIOUS EMBODIMENTS

Figure 2:
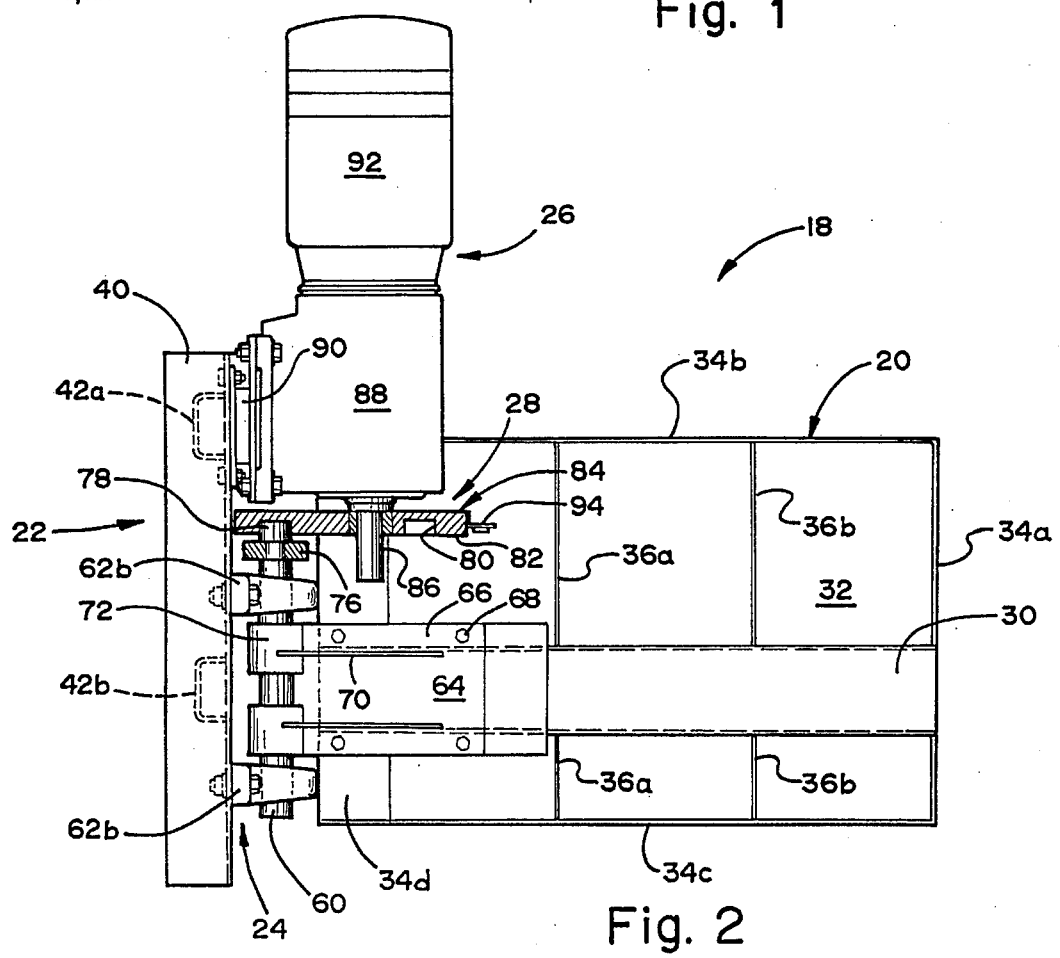
FIG. 2 is a side elevation of the diverter assembly shown in FIG. 1.
Figure 3:
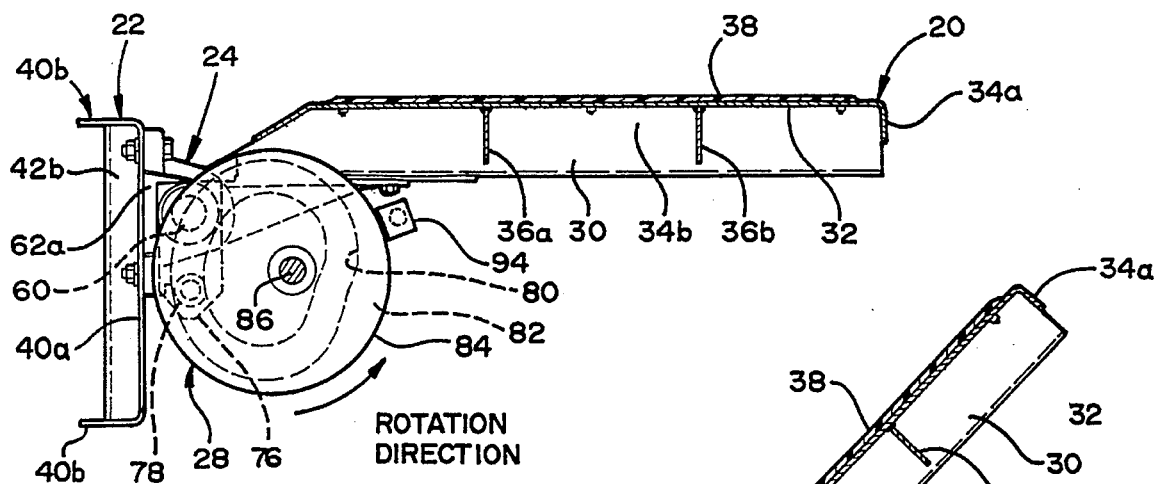
FIGS. 3 and 4 are top views of the diverter assembly shown in FIG. 2 in a resting and deflecting position, respectively.
Figure 4:
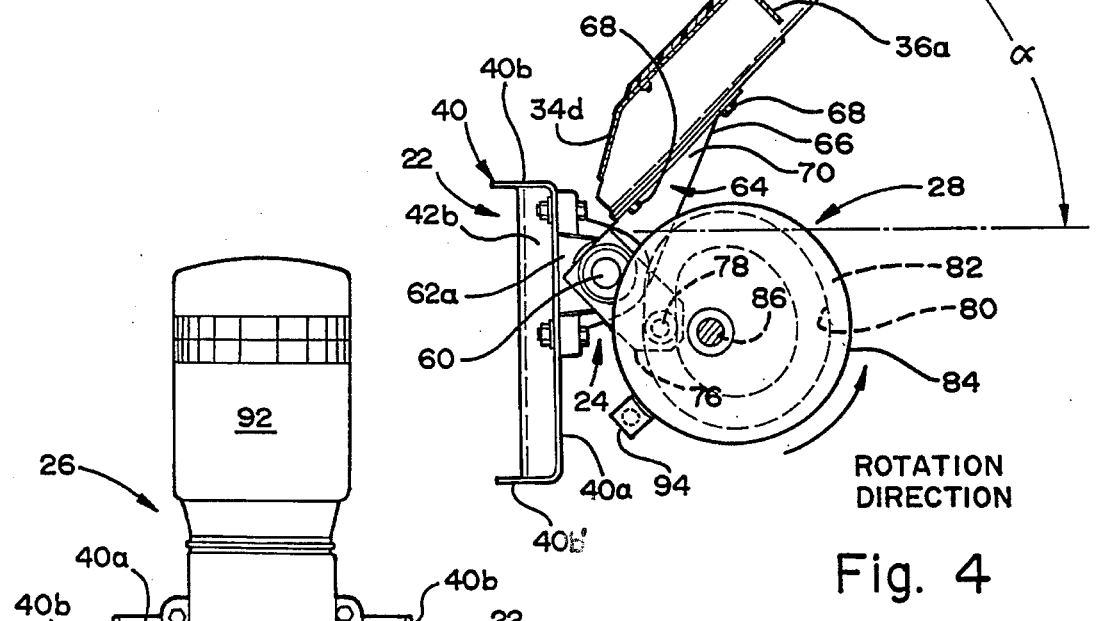
Figure 5:
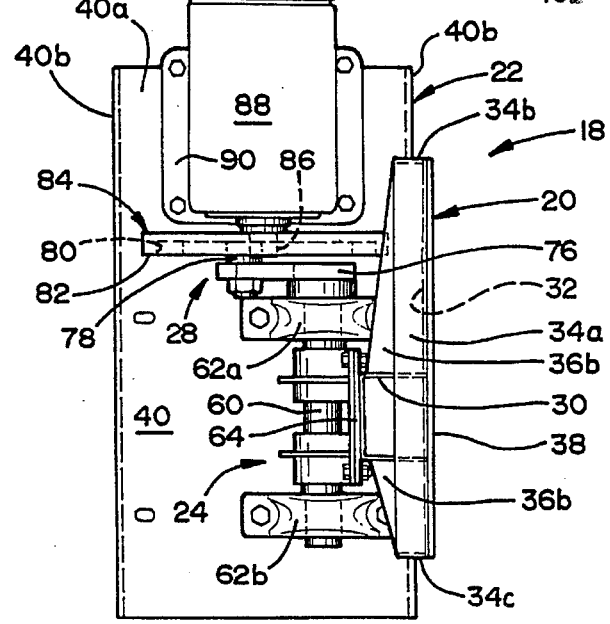
FIG. 5 is an end elevation of the diverter assembly shown in FIG. 2.

For the purposes of the following description, the terms "upper," "lower," "right," "left," "front," "rear," "vertical," ""horizontal," and "derivatives or equivalents thereof" shall relate to the invention as oriented in FIG. 2. It is understood that the invention may assume various alternative orientations, except where expressly specified to the contrary. It is also understood that the specific devices and processes illustrated in the attached drawings, and described in the following specification, are exemplary embodiments of the inventive concepts defined in the appended claims. Hence, specific dimensions and other physical characteristics relating to the embodiments disclosed herein are not to be considered limiting unless the claims expressly state otherwise.

APPARATUS

Figure 1:
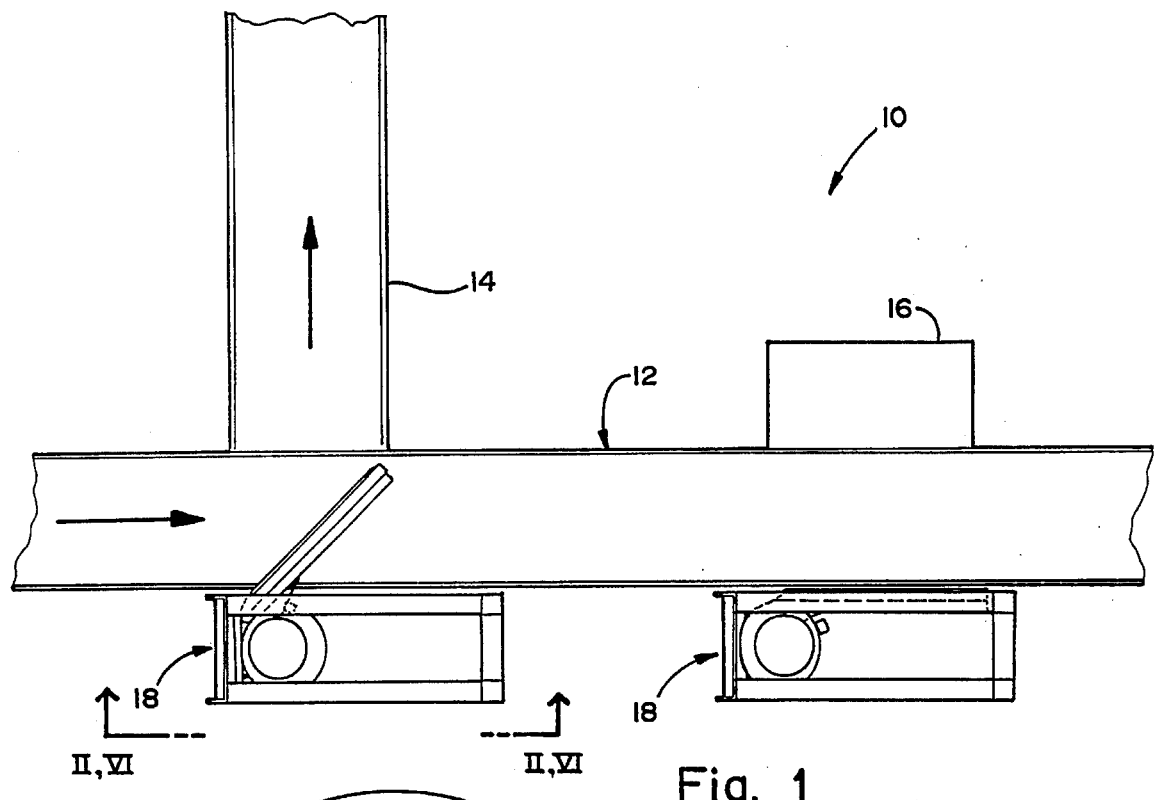
FIG. 1 is a top plan view of a conveyor system utilizing one embodiment of this invention.

Referring to FIG. 1, a conventional, high-speed conveyor system 10 includes one or more trunk lines 12 which feed one or more branch lines 14 or receiving stations 16. Each line 12, 14, of the conveyor system 10 may be formed from a wide range of conveying surfaces including rollers, continuous self-propelled belt systems, moving slats, or the like. Trunk line conveyor 12 usually leads from the point of reception of the articles, past one or more work, processing, and storage stations, to a point of recirculation of the articles. Articles travelling along the trunk line are usually shunted to the branch lines, or delivery stations, for shipment or other treatment of the articles.

The branch conveyors 14 or delivery stations 16 typically extend at a right angle from the trunk line, although branch lines may also extend at an acute angle. The articles on one conveyor are shunted off the conveyor by a diverter assembly 18 located proximate the junctions of the conveyor lines or delivery stations. As shown in FIG. 1, each diverter assembly is shown located adjacent conveyor line 12 so that the diverter may intercept an article and divert it onto branch line 14 or receiving station 16 and retract in another instance to allow articles to pass. Each diverter assembly 18 may be mounted in a separate and independent frame structure temporarily located adjacent the conveyor line 12, 14, or alternatively, may be mounted in a frame structure attached directly to one of the conveyor lines. All of diverter 18 is controlled by a control system (not shown) which forms no part of the invention.

In one embodiment, diverter assembly 18 (FIGS. 2–5) includes an arm assembly 20 pivotally coupled to a from the assembly 22 by a hinge assembly 24 for horizontal movement about a vertical axis to swing from a first or rest position along one side of the conveyor to a second or deflecting position diagonally across the conveyor 12. Arm assembly 20 is actuated between the two positions by a drive assembly 26 mounted to the frame assembly 22. Drive assembly 26 is interconnected indirectly to arm assembly 20 by a cam assembly 28.

Arm Assembly

In a preferred embodiment, arm assembly 20 includes a square or rectangular tubular boom or arm 30 rigidly attached to a panel 32 of a size and shape necessary to divert or shunt articles from the conveyor system. In this particular embodiment, panel 32 is generally rectangular and made substantially rigid by interconnected upper, lower, and end sidewalls 34a, 34b, 34c, and 34d. End wall 34d and the end of arm 30 closest to hinge assembly 24 are angled with respect to panel 32. In addition panel 32 may be reinforced and made substantially rigid by bulkheads 36a, 36b and interconnected to the tubular arm 30 and end walls 34a, 34b.

The components comprising arm assembly 20 are preferably formed from aluminum and welded tog ether to form a weldment in the configuration described above. Panel 32 and end walls 34a–34d may be cut from a single sheet with the end walls 34a–34d formed as tabs and bent into shape. The corners of the adjacent end walls can be welded together to provide a rigid structure. Likewise, bulkheads 36a, 36b may also be cut from aluminum stock and welded to boom 30, end walls 34b, 34c and panel 32. A surface of panel 32 opposite that receiving boom 30 preferably receives a face plate 38 which may be made from a polymeric material to soften the impact of arm assembly 20 on the article as well as provide a low friction surface for diverting articles from the conveyor. A preferred material for face plate 38 is flexible PVC belting over a dense neoprene pad. It is contemplated that arm assembly 20 may be fabricated from a variety of materials ranging from steel plate or a polymeric material depend ting upon the specific size of articles on the conveyor. A composite honeycomb or web panel reinforced with either a plastic or metal frame member may be used to reduce the overall weight of the diverter assembly.

Arm assembly 20 also includes a hinge assembly 24, which pivotally supports arm 30 for movement between the rest and deflecting positions. Hinge assembly 24 preferably includes a shaft or axle 60 mounted to upright member 40 by pillow block bearings 62a, 62b such that shaft 60 lies substantially parallel to the end wall 34d. Swing arm assembly 64 is fixed to shaft 60 between pillow block 62a, 62b and is interconnected to arm 30 by a plate 66. Plate 66 is coupled by one or more detachable fasteners 68 to arm 30 so that differently sized arm assemblies 20 could be substituted depending upon the desired application. Disposed at one end of plate 66, and supported by braces 70, are a pair of cylinders 72, each receiving shaft 60 and rigidly fixed with respect thereto by welds, key slots, or other fasteners.

Frame Assembly

Frame assembly 22 (FIGS. 6 and 7) provides the primary platform for mounting arm assembly 20 and drive assembly 28. Because it carries substantially all of the components of the diverter assembly, frame assembly 22 may be formed from steel or aluminum I-beams, channel steel, or angle-iron steel welded together to provide a rigid foundation. Frame assembly 22 may be fabricated as a stand-alone unit so that diverter assembly 18 may be positioned adjacent the conveyor 12, 14 or may be rigidly fastened to, and made an integral part of, the conveyor frame. Although shown in FIG. 1 as a frame located adjacent the conveyor, diverter assembly 18 may be positioned anywhere at any orientation so long as arm assembly 20 can laterally displace articles on the conveyor in the desired direction.

Figure 7:
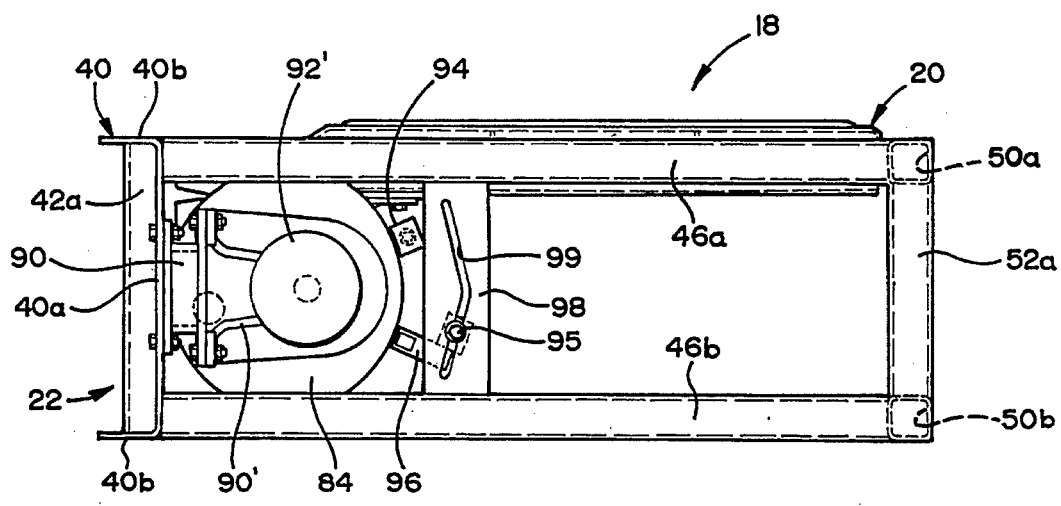
FIG. 7 is a top view of the diverter assembly shown in FIG. 6.
Figure 6:
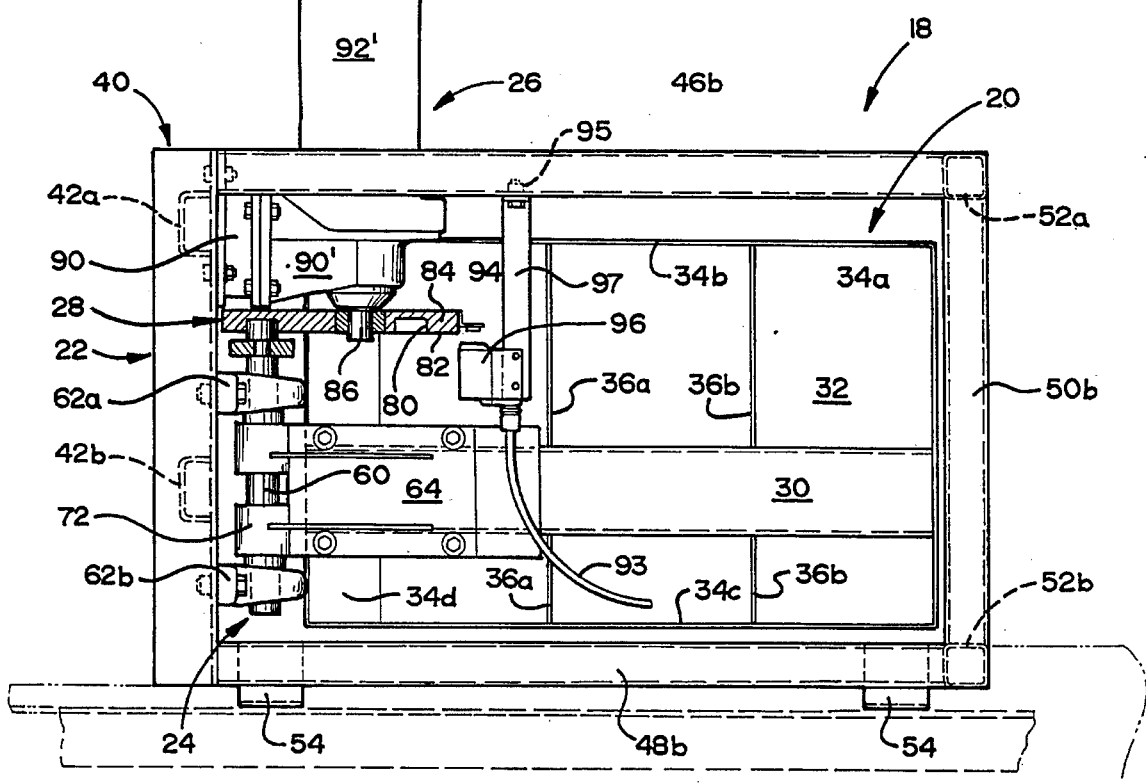
FIG. 6 is a side elevation of an alternate embodiment of diverter assembly mounted in a frame assembly.

In the embodiment shown in FIGS. 1, 6, and 7, frame assembly 22 includes an upright member 40 preferably formed from channel steel, wherein a web 40a of the channel is configured to have drive assembly 26 and hinge assembly 24 anchored thereto by mechanical fasteners. Upright member 40 may be reinforced between the flanges 40b and attached to the web 40a by a plurality of bulkheads 42a and 42b, preferably formed from channel steel, with the flanges welded to web 40a. Preferably, upright member 40 forms one end of a rectangular box frame 44 formed from tubular aluminum or steel including a pair of upper members 46a, 46b (FIG. 7) interconnected to a pair of lower members 48a, 48b by upright member 40 at one end and a pair of end members 50a, 50b at an opposite end. End members 50a, 50b are braced by upper and lower horizontal members 52a, 52b. Frame assembly 22 may be appropriately dimensioned so as to rest on top of a separate platform resting on legs 54 made from angle iron or other stock. Frame assembly 22 may also be anchored to the platform or other frame assembly to stay adjacent the conveyor. Although not shown, diverter assembly 18 may be substantially enclosed by panels made from frames of expanded steel. Each frame may be detachably coupled to an open side of frame assembly 22 to prevent accidental injury caused by the moving components of the diverter.

Drive Assembly

Mounted to the upper end of upright member 40 is drive assembly 26. In one embodiment, drive assembly 26 includes an electric motor 92 coupled at one end in drive relationship with a transmission 88. A motor mount 90 interconnects transmission 88 and motor 92 to upright member 40 and also properly spaces the entire assembly from upright member as will become apparent below.

In a prefer red embodiment of the invention, the electric motor 92 is a unidirectionally driven brake motor capable of rapid acceleration and deceleration. Examples of such motors include Model No. KBA90A, available from Mannasmann Demag Corporation of Solon, Ohio, and Model No. VHM 310H-C available from Sumitomo Machinery Corporation of America of Teterboro, N.J. Each of the these motors operate at approximately 1800 revolutions per minute (rpm) which is reduced to approximately 150 rpm, by transmission 88. Transmission 88 is a gear reducer having an output shaft 86. In the illustrated embodiment, gear reducer 88 is Model No. DO5 available from Mannasmann Demag Corporation and provides an approximate 11 to 1 speed reduction. It should be understood that although motors attached to gear reduction transmission are disclosed as a preferred embodiment, motors capable of operating at the appropriate rpm without gear reducing transmissions may also be used and are considered to be within the scope of the invention. Other motivating force producers, such as pneumatic or hydraulic motors, may also be used.

Cam Assembly

Figure 8:
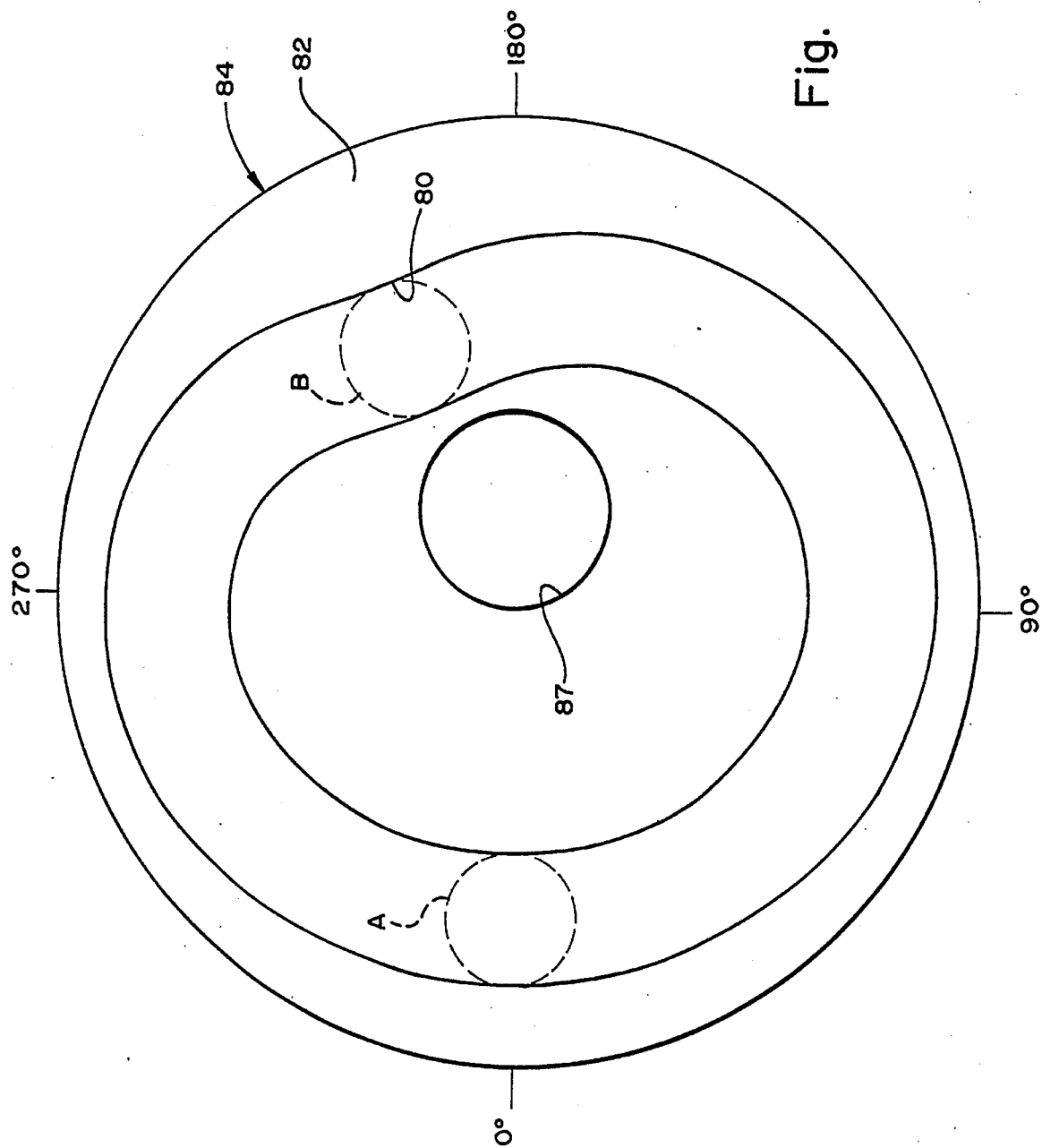
FIG. 8 is at enlarged plan view of one embodiment of a cam plate of the invention.

Drive assembly 26 is interconnected with arm assembly 20 by cam assembly 28. Cam assembly 28 includes a cam follower arm 76 having one end rigidly fastened to an end of shaft 60 proximate drive assembly 26. Cam follower arm 76 is preferably attached to shaft 60 using a detachable fastener such as a tapered lock device. An example of such a fastener is a PowerLock brand Model No. PL 1¼ available from U.S. Tsubaki, Inc. of Wheeling, Ill. The opposite end of arm 76 receives a cam follower 78 which, in turn, is in sliding engagement in a cam groove 80 defined in a lower surface or face 82 of a cam plate 84 (FIG. 8). In a preferred embodiment, cam plate 84 is a circular metal disk, having the cam groove 80 machined therein in a pattern asymmetrical about all axes possibly defined in the plate 84. The cam plate 84 is, in turn, eccentrically mounted through hole 83 to shaft 86 extending from the end of a transmission 88. The shape or profile of cam groove 80 is defined by the amount of cam displacement, in degrees, as a function of angular rotation of cam plate 84 about an axis coincident with transmission shaft 86. A specification for cam surface 80 in the illustrated embodiment is contained in Appendix A. In the embodiment shown, the diameter of plate 84 was reduced substantially for space considerations, resulting in the eccentric location of shaft hole 83. By offsetting hole 83, materials could be economized as well.

In the illustrated embodiment, brake motor 92 is actuated by a control system (not shown) and is deactivated by a sensor 94 located proximate a peripheral edge of cam plate 84 (FIGS. 6 and 7). Sensor 94 is preferably a photocell activated by a reflector 96 mounted to cam plate 84. Photocell 94 located at approximately 300 degrees of revolution such that, upon actuation of photocell 94 by reflector 96, the braking system in motor 92 can stop the motor armature at 360 degrees or one complete revolution. The actual physical location of sensor 94 may vary depending upon the braking speed of motor 92. Optical sensor 94 is positioned adjacent cam plate 84 by a hanger 98 suspended from cross member 95 interconnected to upper members 46a, 46b. The position of sensor 94 may be adjusted by sliding hanger 98 along a slot 97 in cross member 95 and fixed in place by a suitable fastener (not shown).

OPERATION

The diverter assembly 18 is located adjacent or on the conveyor line where the articles are to be diverted. Diverter assembly 18 is coupled to a control system (not shown), which monitors the flow of articles along the conveyor and instructs diverter assembly 18 to actuate the arm into the conveyor path to divert the particular article onto the branch line or receiving station 14, 16. When in the rest position, the diverter arm assembly 20 is initially parallel to and clear of the conveyor path. In this first position, cam plate 84 is oriented with cam follower 78 displaced furthest from shaft 86 and shown as position A in FIG. 8. Upon actuation of motor 92 cam plate 84 revolves one revolution or 360 degrees. In the first 90 degrees of revolution, cam follower 78 within cam groove 80 is displaced toward shaft 86 of transmission 88 in such a fashion that arm assembly 20 pivots about shaft or axle 60 and moves into the conveyor path. At approximately 200 degrees of revolution (point B), cam follower 78 is closest to shaft 86 and arm assembly 20 is fully extended to a diverting position. Between 200 degrees and 270 degrees of rotation, cam assembly 28 causes arm assembly 20 to return to the first position at a velocity greater profile than the movement from the rest position to the point of maximum displacement (between 0° and 200°). This kinematic characteristic of the movement of arm assembly 20 is caused by the asymmetrical shape of cam groove 80 and the offset position of the shaft hole 83 extending through cam plate 84 and is best illustrated in FIG. 9.

FIG. 9 graphically illustrates the kinematic behavior of diverter assembly 18 resulting from the characteristics of asymmetrical cam groove 80. The graph contains four separate curves plotted as a function of cam angle. Curve 100 is a plot of the displacement (in degrees from the rest position) of the cam follower as a function of cam angle (in degrees). Maximum displacement of the cam follower 78, and thus swing arm assembly 20, occurs at approximately 200 degrees. Curve 102, which represents the velocity of the arm assembly, which is the first time derivative of displacement, reaches its greatest level moving from the extended position to the retracted position, occurring at approximately 260 degrees. Curve 102 illustrates that the retraction velocity arm 30 is greater than extension velocity. Acceleration curve 104, which is the first time derivative of velocity, is at its greatest negative value at this same point because arm assembly 20 is changing directions from an extended position to a retracted position. Curve 106 displays the jerk of the arm assembly 20, which is the first time derivative of acceleration. It can be seen that the profiles of arm displacement velocity, acceleration and jerk are defined at each point in the extension and retraction movement of the arm by specification of the cam profile. Therefore, acceleration and jerk may be optimized to a minimum level for the physical configuration of the arm by varying the cam profile.

As an article progresses down the conveyor line 12, the progress may be monitored by a control either through optical character recognition, bar-code, or relative position monitoring systems. When an article to be diverted or routed reaches the particular junction, as detected by a sensor, motor 92, (92' in FIGS. 6 and 7) is actuated by the control. Motor 92 releases its break and quickly completes its many revolutions to produce the one revolution of cam plate 84. In less than 250 milliseconds, the cam follower 78, moved by asymmetrical cam groove 80, causes arm assembly 20 to move about axle 60 in a horizontal plane from the resting or first position parallel to the conveyor to the fully extended diverting position, and forces the article to the opposite edge of the conveyor where it moves onto the intersecting line 14 or receiving station 16. At approximately 300 degrees of rotation, reflector 94 passes over photocell 96 which, in turn, produces a signal instructing motor 92 to turn off. With the removal of power from the motor armature, the break assembly within the motor is actuated, causing the motor 92 and cam 84 to come to a stop at or very close to the start point. Upon the completion of the revolution of the cam, the arm assembly has returned to the resting position in less time than it was extended. Because cam follower 78 is captured, it cannot appreciably float or lose contact with the cam groove surface. At all times, follower 78 is under positive control between the side walls of the channel.

Following he concept of this invention, the motion of arm assembly 20 can be applied to several applications, each operated by a specific cam configuration. The displacement or extent of the stroke, the rate at which the arm assembly or like structure is extended and returned, either of which an be different, and the acceleration and jerk of the arm are controlled by the shape or profile of the cam groove 80 which is specified for all angular positions of the cam. These factors can also be controlled or changed by the type of motor and gear reducer used to rotate the cam. These advantages are also accompanied by less rocking or transverse movements imparted to the conveyor system because the forces are transmitted along the longitudinal direction of the conveyor system have little effect on the conveyor. The present invention is capable of operating the diverter assembly at 150 sorts per minute or more than 2 cycles per second, with fewer breakdown or delays caused by more complicated assemblies.

Optimization of the cam profile may be accomplished utilizing commercially available cam design software. In the preferred embodiment, a polynomial equation definition function is used from the Cam Design Software marketed by Delta Engineering Corporation of Muncie, Indiana. This software generates polynomial coefficients for a set of specified cam displacements and velocities for particular cam angles. By supplying known parameters and evaluating resulting polynomial coefficients generated by the software, an optimum solution may ultimately be achieved. An optimum solution is one that minimizes acceleration and jerk values.

The above description is considered that of the preferred embodiments only. Modification of the invention will occur to those skilled in the art and to those who make and use the invention. Therefore, it is understood that the embodiments shown in the drawings and described above are merely for illustrative purposes and are not intended to limit the scope of the invention, which is intended to be limited only by the scope of the appended claims, as interpreted according to the principles of patent law.

FOLLOWER KINEMATICS OUTPUT

Designer: PHILLIP J. GILMORE  APPENDIX A
Kinematic filename: DIVCAM05.KIN

| CAM ANGLE DEGREES | FOLLOWER DISPLACEMENT DEGREES | FOLLOWER VELOCITY DEGREES/DEG | FOLLOWER ACCELERATION DEGREES/DEG^2 | FOLLOWER JERK DEGREES/DEG^3 |
|---|---|---|---|---|
| Segment number 1 | | | | |
| 0.000000000 | 0.000000000 | 0.00000000000 | 0.00000000000 | 0.00000000000 |
| 10.000000000 | 0.000000000 | 0.00000000000 | 0.00000000000 | 0.00000000000 |

| CAM ANGLE DEGREES | FOLLOWER DISPLACEMENT DEGREES | FOLLOWER VELOCITY DEGREES/DEG | FOLLOWER ACCELERATION DEGREES/DEG^2 | FOLLOWER JERK DEGREES/DEG^3 |
|---|---|---|---|---|
| Segment number 2 | | | | |
| 11.000000000 | 0.000000342 | 0.00000136662 | 0.00000408722 | 0.00000812393 |
| 12.000000000 | 0.000005436 | 0.00001083207 | 0.00001614744 | 0.00001594659 |
| 13.000000000 | 0.000027317 | 0.00003621928 | 0.00003588112 | 0.00002347140 |
| 14.000000000 | 0.000085694 | 0.00008505337 | 0.00006299211 | 0.00003070180 |
| 15.000000000 | 0.000207653 | 0.00016456500 | 0.00009718772 | 0.00003764122 |
| 16.000000000 | 0.000427366 | 0.00028169389 | 0.00013817870 | 0.00004429310 |
| 17.000000000 | 0.000785800 | 0.00044309221 | 0.00018567921 | 0.00005066086 |
| 18.000000000 | 0.001330433 | 0.00065512800 | 0.00023940687 | 0.00005674796 |
| 19.000000000 | 0.002114968 | 0.00092388864 | 0.00029908271 | 0.00006255781 |
| 20.000000000 | 0.003199058 | 0.00125518427 | 0.00036443121 | 0.00006809385 |
| 21.000000000 | 0.004648030 | 0.00165455122 | 0.00043518028 | 0.00007335951 |
| 22.000000000 | 0.006532609 | 0.00212725544 | 0.00051106126 | 0.00007835824 |
| 23.000000000 | 0.008928655 | 0.00267829593 | 0.00059180892 | 0.00008309346 |
| 24.000000000 | 0.011916894 | 0.00331240821 | 0.00067716149 | 0.00008756861 |
| 25.000000000 | 0.015582657 | 0.00403406771 | 0.00076686059 | 0.00009178711 |
| 26.000000000 | 0.020015621 | 0.00484749323 | 0.00086065131 | 0.00009575242 |
| 27.000000000 | 0.025309557 | 0.00575665034 | 0.00095828217 | 0.00009946795 |
| 28.000000000 | 0.031562074 | 0.00676525488 | 0.00105950510 | 0.00010293714 |
| 29.000000000 | 0.038874375 | 0.00787677632 | 0.00116407548 | 0.00010616343 |
| 30.000000000 | 0.047351010 | 0.00909444123 | 0.00127175214 | 0.00010915026 |
| 31.000000000 | 0.057099637 | 0.01042123674 | 0.00138229732 | 0.00011190104 |
| 32.000000000 | 0.068230780 | 0.01185991390 | 0.00149547670 | 0.00011441923 |
| 33.000000000 | 0.080857601 | 0.01341299120 | 0.00161105939 | 0.00011670825 |
| 34.000000000 | 0.095095662 | 0.01508275793 | 0.00172881794 | 0.00011877153 |
| 35.000000000 | 0.111062703 | 0.01687127766 | 0.00184852834 | 0.00012061251 |
| 36.000000000 | 0.128878418 | 0.01878039167 | 0.00196997001 | 0.00012223463 |
| 37.000000000 | 0.148664228 | 0.02081172235 | 0.00209292579 | 0.00012364131 |
| 38.000000000 | 0.170543072 | 0.02296667668 | 0.00221718197 | 0.00012483600 |
| 39.000000000 | 0.194639190 | 0.02524644963 | 0.00234252827 | 0.00012582212 |
| 40.000000000 | 0.221077909 | 0.02765202760 | 0.00246875784 | 0.00012660311 |
| 41.000000000 | 0.249985443 | 0.03018419188 | 0.00259566726 | 0.00012718241 |
| 42.000000000 | 0.281488684 | 0.03284352205 | 0.00272305657 | 0.00012756344 |
| 43.000000000 | 0.315715005 | 0.03563039942 | 0.00285072920 | 0.00012774964 |
| 44.000000000 | 0.352792063 | 0.03854501049 | 0.00297849205 | 0.00012774445 |
| 45.000000000 | 0.392847604 | 0.04158735034 | 0.00310615545 | 0.00012755130 |
| 46.000000000 | 0.436009277 | 0.04475722611 | 0.00323353314 | 0.00012717362 |
| 47.000000000 | 0.482404444 | 0.04805426040 | 0.00336044231 | 0.00012661484 |
| 48.000000000 | 0.532160000 | 0.05147789474 | 0.00348670360 | 0.00012587841 |
| 49.000000000 | 0.585402190 | 0.05502739296 | 0.00361214106 | 0.00012496775 |
| 50.000000000 | 0.642256439 | 0.05870184469 | 0.00373658217 | 0.00012388630 |
| 51.000000000 | 0.702847173 | 0.06250016878 | 0.00385985786 | 0.00012263749 |
| 52.000000000 | 0.767297653 | 0.06642111670 | 0.00398180250 | 0.00012122476 |
| 53.000000000 | 0.835729811 | 0.07046327599 | 0.00410225388 | 0.00011965153 |

FOLLOWER KINEMATICS OUTPUT

Designer: PHILLIP J. GILMORE
Kinematic filename: DIVCAM05.KIN

| CAM ANGLE DEGREES | FOLLOWER DISPLACEMENT DEGREES | FOLLOWER VELOCITY DEGREES/DEG | FOLLOWER ACCELERATION DEGREES/DEG^2 | FOLLOWER JERK DEGREES/DEG^3 |
|---|---|---|---|---|
| Segment number 2 | | | | |
| 54.000000000 | 0.908264086 | 0.07462507374 | 0.00422105321 | 0.00011792125 |
| 55.000000000 | 0.985019263 | 0.07890477993 | 0.00433804517 | 0.00011603735 |
| 56.000000000 | 1.066112323 | 0.08330051095 | 0.00445307785 | 0.00011400326 |
| 57.000000000 | 1.151658284 | 0.08781023301 | 0.00456600278 | 0.00011182241 |
| 58.000000000 | 1.241770060 | 0.09243176553 | 0.00467667491 | 0.00010949825 |
| 59.000000000 | 1.336558312 | 0.09716278465 | 0.00478495265 | 0.00010703420 |
| 60.000000000 | 1.436131306 | 0.10200082660 | 0.00489069782 | 0.00010443369 |
| 61.000000000 | 1.540594774 | 0.10694329115 | 0.00499377569 | 0.00010170017 |
| 62.000000000 | 1.650051786 | 0.11198744507 | 0.00509405495 | 0.00009883706 |
| 63.000000000 | 1.764602608 | 0.11713042553 | 0.00519140775 | 0.00009584780 |
| 64.000000000 | 1.884344584 | 0.12236924356 | 0.00528570964 | 0.00009273582 |
| 65.000000000 | 2.009372005 | 0.12770078747 | 0.00537683962 | 0.00008950455 |
| 66.000000000 | 2.139775992 | 0.13312182628 | 0.00546468013 | 0.00008615744 |
| 67.000000000 | 2.275644375 | 0.13862901316 | 0.00554911704 | 0.00008269792 |
| 68.000000000 | 2.417061582 | 0.14421888887 | 0.00563003964 | 0.00007912941 |
| 69.000000000 | 2.564108527 | 0.14988788520 | 0.00570734066 | 0.00007545535 |
| 70.000000000 | 2.716862503 | 0.15563232836 | 0.00578091629 | 0.00007167918 |
| 71.000000000 | 2.875397076 | 0.16144844248 | 0.00585066612 | 0.00006780432 |
| 72.000000000 | 3.039781988 | 0.16733235299 | 0.00591649319 | 0.00006383423 |
| 73.000000000 | 3.210083058 | 0.17328009007 | 0.00597830397 | 0.00005977232 |
| 74.000000000 | 3.386362090 | 0.17928759210 | 0.00603600836 | 0.00005562203 |
| 75.000000000 | 3.568676782 | 0.18535070907 | 0.00608951971 | 0.00005138679 |
| 76.000000000 | 3.757080636 | 0.19146520605 | 0.00613875478 | 0.00004707005 |
| 77.000000000 | 3.951622882 | 0.19762676657 | 0.00618363378 | 0.00004267522 |
| 78.000000000 | 4.152348393 | 0.20383099608 | 0.00622408034 | 0.00003820576 |
| 79.000000000 | 4.359297609 | 0.21007342543 | 0.00626002156 | 0.00003366508 |
| 80.000000000 | 4.572506464 | 0.21634951421 | 0.00629138792 | 0.00002905664 |
| 81.000000000 | 4.792006322 | 0.22265465427 | 0.00631811338 | 0.00002438384 |
| 82.000000000 | 5.017823900 | 0.22898417309 | 0.00634013531 | 0.00001965015 |
| 83.000000000 | 5.249981217 | 0.23533333727 | 0.00635739451 | 0.00001485897 |
| 84.000000000 | 5.488495527 | 0.24169735592 | 0.00636983524 | 0.00001001376 |
| 85.000000000 | 5.733397266 | 0.24807138411 | 0.00637740517 | 0.00000511794 |
| 86.000000000 | 5.984640000 | 0.25445052632 | 0.00638005540 | 0.00000017495 |
| 87.000000000 | 6.242280376 | 0.26082983983 | 0.00637774049 | -0.00000481177 |
| 88.000000000 | 6.506298075 | 0.26720433821 | 0.00637041842 | -0.00000983880 |
| 89.000000000 | 6.776685772 | 0.27356899470 | 0.00635805059 | -0.00001490270 |
| 90.000000000 | 7.053431096 | 0.27991874570 | 0.00634060185 | -0.00002000004 |
| 91.000000000 | 7.336516596 | 0.28624849415 | 0.00631804048 | -0.00002512738 |
| 92.000000000 | 7.625919708 | 0.29255311299 | 0.00629033821 | -0.00003028129 |
| 93.000000000 | 7.921612728 | 0.29882744860 | 0.00625747016 | -0.00003545834 |
| 94.000000000 | 8.223562786 | 0.30506632422 | 0.00621941494 | -0.00004065509 |
| 95.000000000 | 8.531731825 | 0.31126454339 | 0.00617615455 | -0.00004586810 |
| 96.000000000 | 8.846076583 | 0.31741689338 | 0.00612767444 | -0.00005109395 |
| 97.000000000 | 9.166548580 | 0.32351814863 | 0.00607396350 | -0.00005632919 |
| 98.000000000 | 9.493094104 | 0.32956307418 | 0.00601501405 | -0.00006157040 |
| 99.000000000 | 9.825654205 | 0.33554642911 | 0.00595082183 | -0.00006681415 |
| 100.000000000 | 10.164164691 | 0.34146296995 | 0.00588138603 | -0.00007205699 |
| 101.000000000 | 10.508556126 | 0.34730745415 | 0.00580670928 | -0.00007729549 |
| 102.000000000 | 10.858753834 | 0.35307464350 | 0.00572679762 | -0.00008252623 |
| 103.000000000 | 11.214677904 | 0.35875930754 | 0.00564166054 | -0.00008774576 |
| 104.000000000 | 11.576243201 | 0.36435622703 | 0.00555131096 | -0.00009295065 |
| 105.000000000 | 11.943359375 | 0.36986019737 | 0.00545576524 | -0.00009813747 |
| 106.000000000 | 12.315930883 | 0.37526603201 | 0.00535504316 | -0.00010330279 |

| | | | | |
|---|---|---|---|---|
| 107.000000000 | 12.693857005 | 0.38056856594 | 0.00524916795 | -0.000108443 |
| 108.000000000 | 13.077031868 | 0.38576265905 | 0.00513816627 | -0.000113555 |
| 109.000000000 | 13.465344472 | 0.39084319964 | 0.00502206820 | -0.000118635 |

FOLLOWER KINEMATICS OUTPUT

Designer: PHILLIP J. GILMORE
Kinematic filename: DIVCAM05.KIN

| CAM ANGLE DEGREES | FOLLOWER DISPLACEMENT DEGREES | FOLLOWER VELOCITY DEGREES/DEG | FOLLOWER ACCELERATION DEGREES/DEG$^2$ | FOLLOWER JERK DEGREES/DEG$^3$ |
|---|---|---|---|---|
| Segment number 2 | | | | |
| 110.000000000 | 13.858678723 | 0.39580510778 | 0.00490090727 | -0.00012368032 |
| 111.000000000 | 14.256913462 | 0.40064333883 | 0.00477472043 | -0.00012868660 |
| 112.000000000 | 14.659922505 | 0.40535288677 | 0.00464354809 | -0.00013365077 |
| 113.000000000 | 15.067574686 | 0.40992878773 | 0.00450743406 | -0.00013856940 |
| 114.000000000 | 15.479733892 | 0.41436612337 | 0.00436642560 | -0.00014343905 |
| 115.000000000 | 15.896259120 | 0.41866002432 | 0.00422057341 | -0.00014825629 |
| 116.000000000 | 16.317004523 | 0.42280567362 | 0.00406993162 | -0.00015301768 |
| 117.000000000 | 16.741819463 | 0.42679831017 | 0.00391455779 | -0.00015771980 |
| 118.000000000 | 17.170548571 | 0.43063323214 | 0.00375451290 | -0.00016235921 |
| 119.000000000 | 17.603031808 | 0.43430580040 | 0.00358986140 | -0.00016693247 |
| 120.000000000 | 18.039104529 | 0.43781144198 | 0.00342067114 | -0.00017143615 |
| 121.000000000 | 18.478597548 | 0.44114565349 | 0.00324701343 | -0.00017586681 |
| 122.000000000 | 18.921337215 | 0.44430400455 | 0.00306896298 | -0.00018022103 |
| 123.000000000 | 19.367145485 | 0.44728214123 | 0.00288659797 | -0.00018449537 |
| 124.000000000 | 19.815840000 | 0.45007578947 | 0.00270000000 | -0.00018868639 |
| 125.000000000 | 20.267234170 | 0.45268075855 | 0.00250925409 | -0.00019279066 |
| 126.000000000 | 20.721137255 | 0.45509294447 | 0.00231444872 | -0.00019680475 |
| 127.000000000 | 21.177354459 | 0.45730833343 | 0.00211567579 | -0.00020072522 |
| 128.000000000 | 21.635687015 | 0.45932300526 | 0.00191303062 | -0.00020454864 |
| 129.000000000 | 22.095932288 | 0.46113313681 | 0.00170661198 | -0.00020827157 |
| 130.000000000 | 22.557883867 | 0.46273500543 | 0.00149652209 | -0.00021189059 |
| 131.000000000 | 23.021331670 | 0.46412499240 | 0.00128286656 | -0.00021540225 |
| 132.000000000 | 23.486062052 | 0.46529958634 | 0.00106575449 | -0.00021880313 |
| 133.000000000 | 23.951857910 | 0.46625538665 | 0.00084529835 | -0.00022208979 |
| 134.000000000 | 24.418498798 | 0.46698910696 | 0.00062161410 | -0.00022525879 |
| 135.000000000 | 24.885761040 | 0.46749757857 | 0.00039482111 | -0.00022830671 |
| 136.000000000 | 25.353417855 | 0.46777775384 | 0.00016504218 | -0.00023123010 |
| 137.000000000 | 25.821239473 | 0.46782670966 | -0.00006759644 | -0.00023402554 |
| 138.000000000 | 26.288993268 | 0.46764165088 | -0.00030296511 | -0.00023668958 |
| 139.000000000 | 26.756443881 | 0.46721991375 | -0.00054093069 | -0.00023921881 |
| 140.000000000 | 27.223353358 | 0.46655896932 | -0.00078135665 | -0.00024160977 |
| 141.000000000 | 27.689481285 | 0.46565542692 | -0.00102410302 | -0.00024385904 |
| 142.000000000 | 28.154584928 | 0.46451003755 | -0.00126902639 | -0.00024596319 |
| 143.000000000 | 28.618419375 | 0.46311769737 | -0.00151597991 | -0.00024791878 |
| 144.000000000 | 29.080737686 | 0.46147745106 | -0.00176481331 | -0.00024972238 |
| 145.000000000 | 29.541291039 | 0.45958749531 | -0.00201537288 | -0.00025137055 |
| 146.000000000 | 29.999828689 | 0.45744618224 | -0.00226750147 | -0.00025285986 |
| 147.000000000 | 30.456099119 | 0.45505202283 | -0.00252103851 | -0.00025418687 |
| 148.000000000 | 30.909848208 | 0.45240369034 | -0.00277581999 | -0.00025534816 |
| 149.000000000 | 31.360821387 | 0.44950002380 | -0.00303167845 | -0.00025634028 |
| 150.000000000 | 31.808762812 | 0.44634003134 | -0.00328844303 | -0.00025715980 |
| 151.000000000 | 32.253415733 | 0.44292289374 | -0.00354593941 | -0.00025780330 |
| 152.000000000 | 32.694522668 | 0.43924796779 | -0.00380398983 | -0.00025826733 |
| 153.000000000 | 33.131825582 | 0.43531478974 | -0.00406241312 | -0.00025854846 |
| 154.000000000 | 33.565066068 | 0.43112307874 | -0.00432102467 | -0.00025864327 |
| 155.000000000 | 33.993985528 | 0.42667274027 | -0.00457963642 | -0.00025854830 |
| 156.000000000 | 34.418325369 | 0.42196386960 | -0.00483805689 | -0.00025826014 |
| 157.000000000 | 34.837827184 | 0.41699675516 | -0.00509609117 | -0.00025777534 |
| 158.000000000 | 35.252232957 | 0.41177188205 | -0.00535354090 | -0.00025709048 |
| 159.000000000 | 35.661285255 | 0.40628993540 | -0.00561020431 | -0.00025620211 |
| 160.000000000 | 36.064727431 | 0.40055180389 | -0.00586587617 | -0.00025510681 |
| 161.000000000 | 36.462303830 | 0.39455858308 | -0.00612034782 | -0.00025380114 |
| 162.000000000 | 36.853760000 | 0.38831157895 | -0.00637340719 | -0.00025228166 |

| | | | | |
|---|---|---|---|---|
| 163.000000000 | 37.238842898 | 0.38181231124 | -0.00662483876 | -0.00025054495 |
| 164.000000000 | 37.617301111 | 0.37506251696 | -0.00687442356 | -0.00024858757 |
| 165.000000000 | 37.988885073 | 0.36806415378 | -0.00712193922 | -0.00024640609 |

FOLLOWER KINEMATICS OUTPUT

Designer: PHILLIP J. GILMORE
Kinematic filename: DIVCAM05.KIN

| CAM ANGLE DEGREES | FOLLOWER DISPLACEMENT DEGREES | FOLLOWER VELOCITY DEGREES/DEG | FOLLOWER ACCELERATION DEGREES/DEG$^2$ | FOLLOWER JERK DEGREES/DEG$^3$ |
|---|---|---|---|---|
| gment number 2 | | | | |
| 166.000000000 | 38.353347287 | 0.36081940346 | -0.00736715991 | -0.0002439970 |
| 167.000000000 | 38.710442552 | 0.35333067531 | -0.00760985637 | -0.0002413570 |
| 168.000000000 | 39.059928189 | 0.34560060962 | -0.00784979592 | -0.0002384826 |
| 169.000000000 | 39.401564281 | 0.33763208109 | -0.00808674244 | -0.0002353704 |
| 170.000000000 | 39.735113899 | 0.32942820223 | -0.00832045635 | -0.0002320169 |
| 171.000000000 | 40.060343350 | 0.32099232685 | -0.00855069469 | -0.0002284186 |
| 172.000000000 | 40.377022417 | 0.31232805346 | -0.00877721101 | -0.0002245723 |
| 173.000000000 | 40.684924604 | 0.30343922872 | -0.00899975547 | -0.0002204743 |
| 174.000000000 | 40.983827387 | 0.29432995085 | -0.00921807476 | -0.0002161214 |
| 175.000000000 | 41.273512469 | 0.28500457310 | -0.00943191217 | -0.0002115100 |
| 176.000000000 | 41.553766034 | 0.27546770714 | -0.00964100753 | -0.0002066367 |
| 177.000000000 | 41.824379009 | 0.26572422653 | -0.00984509724 | -0.0002014981 |
| 178.000000000 | 42.085147326 | 0.25577927015 | -0.01004391429 | -0.0001960908 |
| 179.000000000 | 42.335824561 | 0.24563824561 | -0.01023718820 | -0.0001904113 |
| 180.000000000 | 42.576360351 | 0.23530683271 | -0.01042464508 | -0.0001844562 |
| 181.000000000 | 42.806424375 | 0.22479098684 | -0.01060600761 | -0.0001782220 |
| 182.000000000 | 43.025882922 | 0.21409694247 | -0.01078099501 | -0.0001717053 |
| 183.000000000 | 43.234561030 | 0.20323121654 | -0.01094932309 | -0.0001649028 |
| 184.000000000 | 43.432290393 | 0.19220061188 | -0.01111070423 | -0.0001578109 |
| 185.000000000 | 43.618909655 | 0.18101222070 | -0.01126484734 | -0.0001504262 |
| 186.000000000 | 43.794264697 | 0.16967342798 | -0.01141145794 | -0.0001427453 |
| 187.000000000 | 43.958208934 | 0.15819191491 | -0.01155023809 | -0.0001347647 |
| 188.000000000 | 44.110603610 | 0.14657566234 | -0.01168088643 | -0.0001264811 |
| 189.000000000 | 44.251318103 | 0.13483295420 | -0.01180309815 | -0.0001178909 |
| 190.000000000 | 44.380230227 | 0.12297238094 | -0.01191656501 | -0.0001089908 |
| 191.000000000 | 44.497226540 | 0.11100284296 | -0.01202097536 | -0.0000997773 |
| 192.000000000 | 44.602202659 | 0.09893355404 | -0.01211601408 | -0.0000902470 |
| 193.000000000 | 44.695063571 | 0.08677404478 | -0.01220136265 | -0.0000803964 |
| 194.000000000 | 44.775723955 | 0.07453416605 | -0.01227669909 | -0.0000702221 |
| 195.000000000 | 44.844108501 | 0.06222409239 | -0.01234169799 | -0.0000597208 |
| 196.000000000 | 44.900152238 | 0.04985432547 | -0.01239603052 | -0.0000488888 |
| 197.000000000 | 44.943800861 | 0.03743569751 | -0.01243936441 | -0.0000377229 |
| 198.000000000 | 44.975011065 | 0.02497937471 | -0.01247136395 | -0.0000262195 |
| 199.000000000 | 44.993750877 | 0.01249686071 | -0.01249169000 | -0.0000143753 |
| 200.000000000 | 45.000000000 | 0.00000000000 | -0.01249999999 | -0.0000021869 |

| CAM ANGLE DEGREES | FOLLOWER DISPLACEMENT DEGREES | FOLLOWER VELOCITY DEGREES/DEG | FOLLOWER ACCELERATION DEGREES/DEG$^2$ | FOLLOWER JERK DEGREES/DEG$^3$ |
|---|---|---|---|---|
| gment number 3 | | | | |
| 201.000000000 | 44.993749688 | -0.01250087743 | -0.01250151218 | -0.0000007312 |
| 202.000000000 | 44.974998012 | -0.02500243428 | -0.01250125516 | 0.0000013463 |
| 203.000000000 | 44.943745278 | -0.03750259562 | -0.01249862271 | 0.0000040144 |
| 204.000000000 | 44.899994168 | -0.04999869581 | -0.01249303956 | 0.0000072426 |
| 205.000000000 | 44.843750310 | -0.06248750925 | -0.01248396093 | 0.0000110004 |
| 206.000000000 | 44.775022825 | -0.07496528060 | -0.01247087203 | 0.0000152582 |
| 207.000000000 | 44.693824842 | -0.08742775448 | -0.01245328756 | 0.0000199867 |
| 208.000000000 | 44.600173985 | -0.09987020480 | -0.01243075125 | 0.0000251571 |
| 209.000000000 | 44.494092825 | -0.11228746350 | -0.01240283537 | 0.0000307412 |
| 210.000000000 | 44.375609312 | -0.12467394883 | -0.01236914021 | 0.0000367111 |
| 211.000000000 | 44.244757171 | -0.13702369316 | -0.01232929364 | 0.0000430395 |
| 212.000000000 | 44.101576277 | -0.14933037035 | -0.01228295062 | 0.0000496996 |

| | | | | |
|---|---|---|---|---|
| 213.000000000 | 43.946113002 | -0.16158732249 | -0.01222979267 | 0.00005666501 |
| 214.000000000 | 43.778420525 | -0.17378758633 | -0.01216952744 | 0.00006390989 |
| 215.000000000 | 43.598559136 | -0.18592391911 | -0.01210188820 | 0.00007140886 |

FOLLOWER KINEMATICS OUTPUT

Designer: PHILLIP J. GILMORE
Kinematic filename: DIVCAM05.KIN

| CAM ANGLE DEGREES | FOLLOWER DISPLACEMENT DEGREES | FOLLOWER VELOCITY DEGREES/DEG | FOLLOWER ACCELERATION DEGREES/DEG^2 | FOLLOWER JERK DEGREES/DEG^3 |
|---|---|---|---|---|
| egment number 3 | | | | |
| 216.000000000 | 43.406596494 | -0.19798882393 | -0.01202663333 | 0.00007913702 |
| 217.000000000 | 43.202607871 | -0.20997457466 | -0.01194354589 | 0.00008706998 |
| 218.000000000 | 42.986676371 | -0.22187324035 | -0.01185243309 | 0.00009518380 |
| 219.000000000 | 42.758893121 | -0.23367670912 | -0.01175312583 | 0.00010345505 |
| 220.000000000 | 42.519357440 | -0.24537671164 | -0.01164547818 | 0.00011186078 |
| 221.000000000 | 42.268176986 | -0.25696484405 | -0.01152936694 | 0.00012037852 |
| 222.000000000 | 42.005467879 | -0.26843259043 | -0.01140469112 | 0.00012898630 |
| 223.000000000 | 41.731354802 | -0.27977134481 | -0.01127137150 | 0.00013766262 |
| 224.000000000 | 41.445971078 | -0.29097243261 | -0.01112935005 | 0.00014638646 |
| 225.000000000 | 41.149458733 | -0.30202713170 | -0.01097858958 | 0.00015513731 |
| 226.000000000 | 40.841968527 | -0.31292669290 | -0.01081907312 | 0.00016389513 |
| 227.000000000 | 40.523659978 | -0.32366236003 | -0.01065080353 | 0.00017264035 |
| 228.000000000 | 40.194701353 | -0.33422538944 | -0.01047380297 | 0.00018135392 |
| 229.000000000 | 39.855269650 | -0.34460706912 | -0.01028811243 | 0.00019001726 |
| 230.000000000 | 39.505550553 | -0.35479873724 | -0.01009379124 | 0.00019861225 |
| 231.000000000 | 39.145738378 | -0.36479180027 | -0.00989091658 | 0.00020712130 |
| 232.000000000 | 38.776035991 | -0.37457775060 | -0.00967958301 | 0.00021552727 |
| 233.000000000 | 38.396654717 | -0.38414818364 | -0.00945990195 | 0.00022381352 |
| 234.000000000 | 38.007814226 | -0.39349481447 | -0.00923200126 | 0.00023196390 |
| 235.000000000 | 37.609742407 | -0.40260949403 | -0.00899602467 | 0.00023996274 |
| 236.000000000 | 37.202675223 | -0.41148422475 | -0.00875213135 | 0.00024779485 |
| 237.000000000 | 36.786856553 | -0.42011117574 | -0.00850049544 | 0.00025544553 |
| 238.000000000 | 36.362538017 | -0.42848269750 | -0.00824130551 | 0.00026290057 |
| 239.000000000 | 35.929978788 | -0.43659133614 | -0.00797476411 | 0.00027014623 |
| 240.000000000 | 35.489445389 | -0.44442984711 | -0.00770108726 | 0.00027716928 |
| 241.000000000 | 35.041211479 | -0.45199120842 | -0.00742050402 | 0.00028395695 |
| 242.000000000 | 34.585557621 | -0.45926863341 | -0.00713325592 | 0.00029049697 |
| 243.000000000 | 34.122771041 | -0.46625558307 | -0.00683959656 | 0.00029677756 |
| 244.000000000 | 33.653145376 | -0.47294577773 | -0.00653979106 | 0.00030278740 |
| 245.000000000 | 33.176980410 | -0.47933320845 | -0.00623411561 | 0.00030851569 |
| 246.000000000 | 32.694581793 | -0.48541214780 | -0.00592285698 | 0.00031395210 |
| 247.000000000 | 32.206260760 | -0.49117716020 | -0.00560631200 | 0.00031908677 |
| 248.000000000 | 31.712333829 | -0.49662311176 | -0.00528478715 | 0.00032391034 |
| 249.000000000 | 31.213122501 | -0.50174517964 | -0.00495859798 | 0.00032841395 |
| 250.000000000 | 30.708952936 | -0.50653886095 | -0.00462806871 | 0.00033258919 |
| 251.000000000 | 30.200155636 | -0.51099998109 | -0.00429353170 | 0.00033642816 |
| 252.000000000 | 29.687065111 | -0.51512470171 | -0.00395532695 | 0.00033992345 |
| 253.000000000 | 29.170019535 | -0.51890952810 | -0.00361380167 | 0.00034306812 |
| 254.000000000 | 28.649360405 | -0.52235131612 | -0.00326930973 | 0.00034585573 |
| 255.000000000 | 28.125432182 | -0.52544727867 | -0.00292221123 | 0.00034828030 |
| 256.000000000 | 27.598581935 | -0.52819499163 | -0.00257287198 | 0.00035033635 |
| 257.000000000 | 27.069158971 | -0.53059239936 | -0.00222166303 | 0.00035201891 |
| 258.000000000 | 26.537514469 | -0.53263781969 | -0.00186896017 | 0.00035332346 |
| 259.000000000 | 26.004001100 | -0.53432994840 | -0.00151514347 | 0.00035424597 |
| 260.000000000 | 25.468972648 | -0.53566786328 | -0.00116059677 | 0.00035478291 |
| 261.000000000 | 24.932783628 | -0.53665102763 | -0.00080570720 | 0.00035493123 |
| 262.000000000 | 24.395788896 | -0.53727929336 | -0.00045086471 | 0.00035468837 |
| 263.000000000 | 23.858343264 | -0.53755290349 | -0.00009646156 | 0.00035405223 |
| 264.000000000 | 23.320801100 | -0.53747249430 | 0.00025710812 | 0.00035302124 |
| 265.000000000 | 22.783515942 | -0.53703909687 | 0.00060944890 | 0.00035159427 |
| 266.000000000 | 22.246840098 | -0.53625413823 | 0.00096016445 | 0.00034977070 |
| 267.000000000 | 21.711124250 | -0.53511944195 | 0.00130885805 | 0.00034755040 |
| 268.000000000 | 21.176717058 | -0.53363722831 | 0.00165513311 | 0.00034493370 |

| | | | | |
|---|---|---|---|---|
| 269.000000000 | 20.643964764 | −0.53181011393 | 0.00199859360 | 0.00034192 |
| 270.000000000 | 20.113210797 | −0.52964111096 | 0.00233884459 | 0.00033851 |
| 271.000000000 | 19.584795374 | −0.52713362573 | 0.00267549270 | 0.00033471 |

FOLLOWER KINEMATICS OUTPUT

Designer: PHILLIP J. GILMORE
Kinematic filename: DIVCAM05.KIN

| CAM ANGLE DEGREES | FOLLOWER DISPLACEMENT DEGREES | FOLLOWER VELOCITY DEGREES/DEG | FOLLOWER ACCELERATION DEGREES/DEG^2 | FOLLOWER JERK DEGREES/DEG^3 |
|---|---|---|---|---|
| gment number 3 | | | | |
| 272.000000000 | 19.059055111 | -0.52429145700 | 0.00300814658 | 0.00033052693 |
| 273.000000000 | 18.536322629 | -0.52111879362 | 0.00333641743 | 0.00032595047 |
| 274.000000000 | 18.016926167 | -0.51762021178 | 0.00365991947 | 0.00032098988 |
| 275.000000000 | 17.501189196 | -0.51380067176 | 0.00397827040 | 0.00031564892 |
| 276.000000000 | 16.989430034 | -0.50966551417 | 0.00429109191 | 0.00030993180 |
| 277.000000000 | 16.481961472 | -0.50522045573 | 0.00459801019 | 0.00030384326 |
| 278.000000000 | 15.979090397 | -0.50047158456 | 0.00489865634 | 0.00029738847 |
| 279.000000000 | 15.481117426 | -0.49542535496 | 0.00519266695 | 0.00029057314 |
| 280.000000000 | 14.988336539 | -0.49008858176 | 0.00547968450 | 0.00028340343 |
| 281.000000000 | 14.501034725 | -0.48446843410 | 0.00575935790 | 0.00027588600 |
| 282.000000000 | 14.019491627 | -0.47857242882 | 0.00603134296 | 0.00026802799 |
| 283.000000000 | 13.543979204 | -0.47240842331 | 0.00629530288 | 0.00025983702 |
| 284.000000000 | 13.074761388 | -0.46598460785 | 0.00655090871 | 0.00025132120 |
| 285.000000000 | 12.612093757 | -0.45930949754 | 0.00679783987 | 0.00024248914 |
| 286.000000000 | 12.156223217 | -0.45239192369 | 0.00703578460 | 0.00023334992 |
| 287.000000000 | 11.707387688 | -0.44524102472 | 0.00726444050 | 0.00022391310 |
| 288.000000000 | 11.265815801 | -0.43786623661 | 0.00748351496 | 0.00021418874 |
| 289.000000000 | 10.831726606 | -0.43027728285 | 0.00769272565 | 0.00020418738 |
| 290.000000000 | 10.405329293 | -0.42248416387 | 0.00789180105 | 0.00019392003 |
| 291.000000000 | 9.986822914 | -0.41449714607 | 0.00808048089 | 0.00018339822 |
| 292.000000000 | 9.576396130 | -0.40632675026 | 0.00825851666 | 0.00017263393 |
| 293.000000000 | 9.174226955 | -0.39798373968 | 0.00842567208 | 0.00016163965 |
| 294.000000000 | 8.780482526 | -0.38947910754 | 0.00858172360 | 0.00015042833 |
| 295.000000000 | 8.395318879 | -0.38082406404 | 0.00872646088 | 0.00013901344 |
| 296.000000000 | 8.018880733 | -0.37203002291 | 0.00885968726 | 0.00012740890 |
| 297.000000000 | 7.651301300 | -0.36310858747 | 0.00898122028 | 0.00011562915 |
| 298.000000000 | 7.292702098 | -0.35407153625 | 0.00909089211 | 0.00010368908 |
| 299.000000000 | 6.943192788 | -0.34493080803 | 0.00918855011 | 0.00009160408 |
| 300.000000000 | 6.602871015 | -0.33569848649 | 0.00927405726 | 0.00007939004 |
| 301.000000000 | 6.271822276 | -0.32638678429 | 0.00934729264 | 0.00006706333 |
| 302.000000000 | 5.950119799 | -0.31700802675 | 0.00940815196 | 0.00005464077 |
| 303.000000000 | 5.637824435 | -0.30757463499 | 0.00945654801 | 0.00004213972 |
| 304.000000000 | 5.334984575 | -0.29809910856 | 0.00949241117 | 0.00002957799 |
| 305.000000000 | 5.041636077 | -0.28859400767 | 0.00951568986 | 0.00001697388 |
| 306.000000000 | 4.757802217 | -0.27907193487 | 0.00952635107 | 0.00000434619 |
| 307.000000000 | 4.483493655 | -0.26954551624 | 0.00952438080 | -0.00000828580 |
| 308.000000000 | 4.218708423 | -0.26002738214 | 0.00950978459 | -0.00002090236 |
| 309.000000000 | 3.963431924 | -0.25053014743 | 0.00948258796 | -0.00003348322 |
| 310.000000000 | 3.717636968 | -0.24106639125 | 0.00944283693 | -0.00004600765 |
| 311.000000000 | 3.481283807 | -0.23164863627 | 0.00939059851 | -0.00005845444 |
| 312.000000000 | 3.254320212 | -0.22228932745 | 0.00932596114 | -0.00007080188 |
| 313.000000000 | 3.036681554 | -0.21300081041 | 0.00924903523 | -0.00008302780 |
| 314.000000000 | 2.828290918 | -0.20379530916 | 0.00915995360 | -0.00009510950 |
| 315.000000000 | 2.629059235 | -0.19468490347 | 0.00905887199 | -0.00010702384 |
| 316.000000000 | 2.438885439 | -0.18568150572 | 0.00894596955 | -0.00011874718 |
| 317.000000000 | 2.257656645 | -0.17679683724 | 0.00882144931 | -0.00013025538 |
| 318.000000000 | 2.085248350 | -0.16804240418 | 0.00868553868 | -0.00014152383 |
| 319.000000000 | 1.921524666 | -0.15942947289 | 0.00853848990 | -0.00015252744 |
| 320.000000000 | 1.766338567 | -0.15096904484 | 0.00838058059 | -0.00016324061 |
| 321.000000000 | 1.619532168 | -0.14267183104 | 0.00821211416 | -0.00017363727 |
| 322.000000000 | 1.480937031 | -0.13454822594 | 0.00803342037 | -0.00018369088 |
| 323.000000000 | 1.350374492 | -0.12660828089 | 0.00784485575 | -0.00019337438 |
| 324.000000000 | 1.227656018 | -0.11886167709 | 0.00764680412 | -0.00020266026 |

| 325.000000000 | 1.112583592 | -0.11131769811 | 0.00743967707 | -0.00021152051 |
| 326.000000000 | 1.004950122 | -0.10398520179 | 0.00722391446 | -0.00021992661 |
| 327.000000000 | 0.904539887 | -0.09687259184 | 0.00699998486 | -0.00022784960 |

FOLLOWER KINEMATICS OUTPUT

Designer: PHILLIP J. GILMORE
Kinematic filename: DIVCAM05.KIN

| CAM ANGLE DEGREES | FOLLOWER DISPLACEMENT DEGREES | FOLLOWER VELOCITY DEGREES/DEG | FOLLOWER ACCELERATION DEGREES/DEG$^{-2}$ | FOLL JE DEGREE |
|---|---|---|---|---|
| segment number 3 | | | | |
| 328.000000000 | 0.811128997 | -0.08998778879 | 0.00676838609 | -0.000 |
| 329.000000000 | 0.724485899 | -0.08333820055 | 0.00652964567 | -0.000 |
| 330.000000000 | 0.644371897 | -0.07693069243 | 0.00628432132 | -0.000 |
| 331.000000000 | 0.570541716 | -0.07077155677 | 0.00603300143 | -0.000 |
| 332.000000000 | 0.502744089 | -0.06486648192 | 0.00577630557 | -0.000 |
| 333.000000000 | 0.440722374 | -0.05922052091 | 0.00551488495 | -0.000 |
| 334.000000000 | 0.384215206 | -0.05383805951 | 0.00524942293 | -0.000 |
| 335.000000000 | 0.332957185 | -0.04872278389 | 0.00498063548 | -0.000 |
| 336.000000000 | 0.286679583 | -0.04387764770 | 0.00470927169 | -0.000 |
| 337.000000000 | 0.245111104 | -0.03930483877 | 0.00443611424 | -0.000 |
| 338.000000000 | 0.207978658 | -0.03500574524 | 0.00416197988 | -0.000 |
| 339.000000000 | 0.175008181 | -0.03098092127 | 0.00388771992 | -0.000 |
| 340.000000000 | 0.145925487 | -0.02723005220 | 0.00361422074 | -0.000 |
| 341.000000000 | 0.120457154 | -0.02375191929 | 0.00334240425 | -0.000 |
| 342.000000000 | 0.098331445 | -0.02054436391 | 0.00307322836 | -0.000 |
| 343.000000000 | 0.079279267 | -0.01760425131 | 0.00280768750 | -0.000 |
| 344.000000000 | 0.063035166 | -0.01492743384 | 0.00254681310 | -0.000 |
| 345.000000000 | 0.049338355 | -0.01250871375 | 0.00229167405 | -0.000 |
| 346.000000000 | 0.037933789 | -0.01034180544 | 0.00204337720 | -0.000 |
| 347.000000000 | 0.028573265 | -0.00841929728 | 0.00180306787 | -0.000 |
| 348.000000000 | 0.021016573 | -0.00673261290 | 0.00157193028 | -0.000 |
| 349.000000000 | 0.015032677 | -0.00527197203 | 0.00135118809 | -0.000 |
| 350.000000000 | 0.010400941 | -0.00402635084 | 0.00114210487 | -0.000 |
| 351.000000000 | 0.006912390 | -0.00298344178 | 0.00094598454 | -0.000 |
| 352.000000000 | 0.004371016 | -0.00212961298 | 0.00076417194 | -0.000 |
| 353.000000000 | 0.002595121 | -0.00144986708 | 0.00059805323 | -0.000 |
| 354.000000000 | 0.001418706 | -0.00092779968 | 0.00044905645 | -0.000 |
| 355.000000000 | 0.000692897 | -0.00054555724 | 0.00031865193 | -0.000 |
| 356.000000000 | 0.000287414 | -0.00028379448 | 0.00020835286 | -0.000 |
| 357.000000000 | 0.000092090 | -0.00012163137 | 0.00011971569 | -0.000 |
| 358.000000000 | 0.000018420 | -0.00003660953 | 0.00005434069 | -0.000 |
| 359.000000000 | 0.000001166 | -0.00000464826 | 0.00001387236 | -0.000 |
| 360.000000000 | 0.000000000 | 0.00000000000 | 0.00000000000 | 0.000 |

The embodiments of the invention in which an exclusive property or privilege is claimed are defined as follows:

1. An article diverter for laterally displacing articles travelling along a conveyor, comprising:

an arm moving in a first plane, between a first resting position generally parallel the conveyor and a second deflecting position at least partially across the conveyor; and a rotating cam assembly having a cam member, a cam groove defined in said member and connected to said arm, wherein said cam groove has a configuration that will move said arm from said first position to said second position according to a first velocity profile, and from said second position to said first position according to a second velocity profile that is greater than said first velocity profile, displacing the article, wherein said groove is asymmetrical about all axes defined through both said groove and the axis of rotation of the cam member, and wherein said arm moves from said first resting position to said second deflecting position and back to said first position in one revolution of said cam member.

2. The diverter in claim 1 wherein said cam member makes one complete revolution in less than approximately 0.5 second.

3. The diverter in claim 1 wherein said arm is moved from said first position to said second position by approximately 200 degrees of revolution of said cam.

4. An article diverter for laterally displacing articles travelling along a conveyor, comprising:

an arm moving in a first plane, between a first resting position generally parallel the conveyor and a second deflecting position at least partially across the conveyor; and a rotating cam assembly having a cam member, a cam groove defined in said member and connected to said arm, wherein said cam groove has a configuration that will move said arm from said first position to said second position according to a first velocity profile, and from said second position to said first position according to a second velocity profile that is greater than said first velocity profile, displacing the article wherein said groove is asymmetrical about all axes defined through both said groove and the axis of rotation of the cam member, and wherein said arm moves from said first resting position to said second deflecting position and back to said first position in one revolution of said cam member; and a sensor for indicating one revolution of said rotating cam member and causing said rotating cam member to stop at said one revolution.

5. The diverter in claim 4, further including a frame assembly for positioning the arm and rotating cam assembly adjacent the conveyor.

6. The diverter in claim 5, wherein said rotating cam assembly further includes a unidirectional drive assembly attached to said frame and having a rotatable shaft coupled to said cam member.

7. The diverter in claim 4 wherein said cam member makes one complete revolution in less than approximately 0.5 second.

8. The diverter in claim 4 wherein said arm is moved from said first position to said second position by approximately 200 degrees of revolution of said cam.

9. An article diverter for laterally displacing articles travelling along a conveyor, comprising:

an arm moving in a first plane, between a first resting position generally parallel the conveyor and a second deflecting position at least partially across the conveyor; and a rotating cam assembly having a cam member a closed channel defining a cam groove in said member and connected to said arm, wherein said cam groove has a configuration that will move said arm from said first position to said second position according to a first velocity profile, and from said second position to said first position according to a second velocity profile that is greater than said first velocity profile, displacing the article; and a cam follower having a first end disposed in said closed cam groove, and an opposite end rigidly attached to said arm.

10. The diverter in claim 9 wherein said cam member makes one complete revolution in less than approximately 0.5 second.

11. The diverter in claim 9 wherein said arm is moved from said first position to said second position by approximately 200 degrees of revolution of said cam.

12. An article diverter for laterally displacing articles travelling along a conveyor, comprising:

an arm moving in a first plane, between a first resting position generally parallel the conveyor and a second deflecting position at least partially across the conveyor; and a rotating cam assembly having a cam member, a cam groove defined in said member and connected to said arm, wherein said cam groove has a configuration that will move said arm from said first position to said second position according to a first velocity profile, and from said second position to said first position according to a second velocity profile that is greater than said first velocity profile, displacing the article;

wherein said arm groove includes:

a first groove portion for moving said arm between said first resting position and said second deflecting position; and a second groove portion for moving said arm between said second deflecting position and said first resting position.

13. The diverter in claim 12 wherein said arm is moved from said first position to said second position and back to said first position in less than approximately 0.5 second.

14. The diverter in claim 12 wherein said arm is moved from said first position to said second position by approximately 200 degrees of revolution of said cam.

15. An article diverter for laterally displacing articles travelling along a conveyor, comprising:

a frame;

an arm supported from said frame for movement between a first resting position and a second deflecting position at least partially across the conveyor;

a cam rotatably supported from said frame and having a face containing a cam groove;

a cam follower engaging said cam groove and coupled to said arm for moving said arm; and a unidirectional drive attached to said frame and having a rotatable shaft extending therefrom coupled in drive relationship to said rotatable cam, wherein said arm is moved from said first position to said second position and back to said first position in one complete revolution of said cam, displacing the article.

16. The diverter in claim 15 wherein said cam groove is asymmetrical about all axes parallel to said face extending through the axis of rotation of said cam, whereby said arm is retracted from said second position into said first position faster than said arm is extended from said first position to said second position.

17. The diverter in claim 15, wherein said cam groove includes:

a first portion of said cam groove for moving said arm coupled to said cam follower between said first and second positions according to a first velocity profile; and a second portion of said cam groove for moving said arm coupled to said cam follower between said second and first positions according to a second velocity profile that is greater than said first velocity profile.

18. The diverter in claim 17, further including:

a marker attached to one of said rotatable cam and said frame to indicate a single revolution of said rotatable cam on said rotatable shaft;

a detector located proximate said rotatable cam for detecting a passing of said marker and outputting a signal indicating a completion of said revolution of said rotatable cam; and a brake operably coupled to said detector for stopping said rotatable cam after completion of said cycle.

19. A high-speed paddle diverter for use in association with a conveyor, comprising:

a frame member;

a paddle diverter blade;

a hinge assembly pivotally interconnecting said paddle diverter blade to said frame;

a motor assembly attached to said frame and having a shaft extending therefrom;

a cam plate received on said shaft, said cam plate defining a closed cam slot therein that is asymmetric about all axes passing through said groove and said shaft;

a cam follower disposed in said closed asymmetric cam slot and attached to said hinge assembly; and a detector disposed for detecting one revolution of said cam plate about said shaft; whereby one revolution of said cam plate produced by said motor assembly moves said paddle diverter blade through one cycle from said first position to said second position and back to said first position, said one resolution of said cam plate detected by said detector detecting said position marker on said cam plate.

20. The high-speed paddle diverter as defined in claim 12, wherein said closed asymmetric cam slots includes:

a first portion configured to drive said paddle diverter blade from a resting position generally parallel to the conveyor to a deflecting position across the conveyor at a first velocity; and a second portion configured to drive said paddle diverter blade from said deflecting position to said resting position at a second velocity greater than said first velocity.

21. The high-speed paddle diverter as defined in claim 20, wherein said motor assembly includes:

a motor; and a transmission coupled to said motor for providing a shaft-output operating at an rpm substantially less than said motor.

22. The high-speed paddle diverter as defined in claim 21, wherein said motor includes a brake motor.

23. The high-speed paddle diverter as defined in claim 19, wherein said cam plate is concentrically received or said shaft.

24. The high-speed paddle diverter as defined in claim 19, wherein said detector includes a fixed index or mark on said cam plate detected by said deflector as said cam plate revolves about said shaft.

25. A method for laterally displacing an article travelling along a conveyor, including:

providing a diverter arm assembly adjacent the conveyor and supported for movement in a plane between a resting position generally parallel the conveyor and an extended position at least partially across the conveyor; and moving said diverter arm assembly from said resting position to said extended position according to a first velocity profile to laterally divert an article on said conveyors and from said extended position to said resting position according to a second velocity profile that is greater than said first velocity profile to allow other articles to continue down the conveyor, wherein said first and second velocity profiles are predetermined at substantially all displacement positions of said diverter arm, wherein at least one of acceleration and jerk of said diverter arm may be optimized to a minimum level for the physical configuration of the diverter arm;

wherein moving said diverter arm assembly includes mechanically coupling a rotary cam plate to said diverter arm assembly and rotating said cam plate unidirectionally one complete revolution to move said diverter arm assembly.

26. The method as recited in claim 25 including rotating said cam plate through one complete revolution in less than approximately 0.5 second.

27. The method as recited in claim 25 wherein said moving said diverter arm assembly from said resting position to said extended position includes rotating said cam plate approximately 200 degrees.

28. A method for laterally displacing an article travelling along a conveyor, including:

providing a diverter arm assembly adjacent the conveyor and supported for movement in a plane between a resting position generally parallel the conveyor and an extended position at least partially across the conveyor; and moving said diverter arm assembly from said resting position to said extended position according to a first velocity profile to laterally divert an article on said conveyor, and from said extended position to said resting position according to a second velocity profile that is greater than said first velocity profile to allow other articles to continue down the conveyor, wherein said first and second velocity profiles are predetermined at substantially all displacement positions of said diverter arm, wherein at least one of acceleration and jerk of said diverter arm may be optimized to a minimum level for the physical configuration of the diverter arm;

wherein moving said diverter arm assembly includes mechanically coupling a rotary cam plate to said diverter arm assembly and rotating said cam plate to move said diverter arm assembly; and wherein said rotating said cam plate includes:

driving an electric motor attached to said cam plate through a shaft at a predetermined rpm;
sensing a rotation of said cam plate using a marker to generate an output signal; and
stopping said electric motor in response to said output signal such that said cam date attached to said shaft completes said cycle.

29. The method as recited in claim 28, wherein the step of providing said diverter arm assembly includes supporting said diverter arm assembly on the conveyor for movement in a horizontal plane above the conveyor.

30. The method as recited in claim 28, wherein the step of providing said diverter arm assembly includes supporting said diverter arm assembly on a frame disposed adjacent the conveyor so said diverter arm assembly moves in a horizontal plane between said resting and extended positions.

31. The method as recited in claim 28 including moving said diverter arm assembly from said resting position to said extended position and back to said resting position in less than approximately 0.5 second.

32. The method as recited in claim 28 wherein said moving said diverter arm assembly from said resting position to said extended position includes rotating said cam plate approximately 200 degrees.

33. A method for laterally displacing an article travelling along a conveyor, including:
providing a diverter arm assembly adjacent the conveyor and supported for movement in a plane between a resting position generally parallel the conveyor and an extended position at least partially across the conveyor; and
moving said diverter arm assembly from said resting position to said extended position according to a first velocity profile to laterally divert an article on said conveyor, and from said extended position to said resting position according to a second velocity profile that is greater than said first velocity profile to allow other articles to continue down the conveyor, wherein said first and second velocity profiles are predetermined at substantially all displacement positions of said diverter arm wherein at least one of acceleration and jerk of said diverter arm may be optimized to a minimum level for the physical configuration of the diverter arm;
wherein said loving said diverter arm assembly includes:
mechanically coupling a rotary cam plate to said diverter arm assembly;
providing said cam plate with a cam groove defined in one face of said cam, said cam groove forming an asymmetric closed loop;
capturing a cam follower interconnected to said diverter arm assembly in said cam groove; and
rotating said cam plate whereby rotation of said cam plate displaces said cam follower captured in said cam groove thereby moving said diverter arm assembly from said resting position to said extended position and back to said resting position.

34. The method as recited in claim 33 wherein said moving said diverter arm assembly from said resting position to said extended position includes rotating said cam plate approximately 200 degrees.

35. The method as recited in claim 33 including moving said diverter arm assembly from said resting position to said extended position and back to said resting position in less than approximately 0.5 second.

* * * * *

UNITED STATES PATENT AND TRADEMARK OFFICE
CERTIFICATE OF CORRECTION

PATENT NO. : 5,452,786
DATED : September 26, 1995
INVENTOR(S) : Phillip J. Gilmore It is certified that error appears in the above-indentified patent and that said Letters Patent is hereby corrected as shown below:

In the Abstract, line 2:
"An am" should be --An arm--.

Column 1, line 20:
"convey or" should be --conveyor--.

Column 1, line 32:
"across he" should be --across the--.

Column 2, line 27:
"is at" should be --is an--.

Column 3, line 16:
"from the" should be --frame--.

Column 3, line 40:
"tog ether" should be --together--.

Column 3, line 44:
"comers" should be --corners--.

Column 3, line 56:
"depend ting" should be --depending--.

Column 4, line 60:
"prefer red" should be --preferred--.

Column 5, line 46:
After "94" insert --is--.

Column 6, line 4:
"can plate" should be --cam plate--.

UNITED STATES PATENT AND TRADEMARK OFFICE
CERTIFICATE OF CORRECTION

PATENT NO. : 5,452,786
DATED : September 26, 1995
INVENTOR(S) : Phillip J. Gilmore It is certified that error appears in the above-indentified patent and that said Letters Patent is hereby corrected as shown below:

Column 6, line 5:
"car follower" should be --cam follower--.

Column 7, line 5:
"he concept" should be --the concept--.

Column 7, line 9:
"which an" should be --which can--.

Column 34, line 37, claim 12:
"arm" should be --cam--.

Column 35, line 47, claim 19:
"resolution" should be --revolution--.

Column 35, line 50, claim 20:
"claim 12" should be --claim 19--.

Column 36, line 3, claim 23:
"or said" should be --on said--.

UNITED STATES PATENT AND TRADEMARK OFFICE
CERTIFICATE OF CORRECTION

PATENT NO. : 5,452,786
DATED : September 26, 1995
INVENTOR(S) : Phillip J. Gilmore It is certified that error appears in the above-indentified patent and that said Letters Patent is hereby corrected as shown below:

Column 36, line 19, claim 25:
"conveyors" should be --conveyor,--.

Column 37, line 5, claim 28:
"date" should be --plate--.

Column 38, line 11, claim 33:
"loving" should be --moving--.

Signed and Sealed this

Twenty-fifth Day of June, 1996

BRUCE LEHMAN

*Attest:*

*Attesting Officer*   *Commissioner of Patents and Trademarks*